United States Patent
Ahdritz et al.

(10) Patent No.: US 9,336,360 B1
(45) Date of Patent: May 10, 2016

(54) ANALYSIS AND DISPLAY OF A PRECIS OF GLOBAL LICENSING ACTIVITIES

(71) Applicant: Kobalt Music Group Limited, London (GB)

(72) Inventors: Willard Bengt Anders Ahdritz, Scarsdale, NY (US); Raphael Willy Robert Amselli, Essex (GB); Simon Thomas Dennett, New York, NY (US); James Piers Fitzherbert-Brockholes, Isle of Wight (GB); Richard Alwin Curtis Thompson, London (GB)

(73) Assignee: Kobalt Music Group Limited, London (GB)

( * ) Notice: Subject to any disclaimer, the term of this patent is extended or adjusted under 35 U.S.C. 154(b) by 0 days.

(21) Appl. No.: 13/829,891

(22) Filed: Mar. 14, 2013

(51) Int. Cl.
- *G06F 21/00* (2013.01)
- *G06F 21/10* (2013.01)
- *G06Q 50/18* (2012.01)
- *G06Q 40/00* (2012.01)

(52) U.S. Cl.
CPC .............. *G06F 21/10* (2013.01); *G06Q 40/00* (2013.01); *G06Q 50/184* (2013.01)

(58) Field of Classification Search
USPC .......................................................... 705/51
See application file for complete search history.

(56) References Cited

U.S. PATENT DOCUMENTS

| | | | |
|---|---|---|---|
| 6,282,653 | B1 | 8/2001 | Berstis et al. |
| 6,636,867 | B2 | 10/2003 | Robertson |
| 6,961,714 | B1 | 11/2005 | LeVine |
| 7,092,953 | B1 | 8/2006 | Haynes |
| 7,209,892 | B1 | 4/2007 | Galuten et al. |
| 7,353,206 | B2 | 4/2008 | Entani |
| 7,505,936 | B2 | 3/2009 | Huffman et al. |
| 7,707,224 | B2 | 4/2010 | Chastagnol et al. |
| 7,747,474 | B2 | 6/2010 | Miloslavsky et al. |
| 7,849,393 | B1 | 12/2010 | Hendricks et al. |
| 8,015,615 | B1 | 9/2011 | Agrawal et al. |

(Continued)

FOREIGN PATENT DOCUMENTS

| | | |
|---|---|---|
| CA | 2 742 714 A1 | 5/2010 |
| DE | 10 2008 024 554 A1 | 11/2009 |

(Continued)

OTHER PUBLICATIONS

Accenture brochure, Accenture Rights and Royalties Service Center, End-to-end solutions for intellectual property management, Accenture, copyright 2007, 4 pages.

(Continued)

*Primary Examiner* — Zeshan Qayyum
(74) *Attorney, Agent, or Firm* — Brinks Gilson & Lione

(57) ABSTRACT

The system and method provide an efficient and effective way to provision views of up to date ongoing activities associated with the works of a client (e.g., global registration of rights relating to licensing of multimedia material) by territory and content. The system provides the client a way to configure a selection précis of up to date activities and extract from a full complement of data (e.g., royalty administration and rights management life cycle metrics) received from global partners responsible for collecting work rights information. The system reformats the data received from partners into a unified format, applies compression rules to obtain an optimized summary of the data, and filters the summarized data according to the predetermined client customized preferences.

20 Claims, 7 Drawing Sheets

(56) References Cited

U.S. PATENT DOCUMENTS

| | | | |
|---|---|---|---|
| 8,117,094 B2 | 2/2012 | Multerer et al. | |
| 8,117,130 B2 | 2/2012 | Aydar et al. | |
| 8,166,118 B1 | 4/2012 | Borghetti | |
| 8,180,792 B2 | 5/2012 | Fanning et al. | |
| 8,185,435 B2 | 5/2012 | Aaron et al. | |
| 8,219,494 B1 | 7/2012 | Pride et al. | |
| 8,255,812 B1 | 8/2012 | Parparita et al. | |
| 8,260,713 B2 | 9/2012 | Holcombe | |
| 8,265,999 B1 | 9/2012 | Decker | |
| 8,346,585 B1 | 1/2013 | Griffith et al. | |
| 2001/0047339 A1 | 11/2001 | Entani | |
| 2002/0107809 A1 | 8/2002 | Biddle et al. | |
| 2003/0104827 A1* | 6/2003 | Moran | H04L 51/066 455/466 |
| 2004/0009763 A1* | 1/2004 | Stone | H04N 21/8358 455/410 |
| 2004/0024688 A1 | 2/2004 | Bi et al. | |
| 2004/0030653 A1 | 2/2004 | Christensen | |
| 2005/0216401 A1 | 9/2005 | Rines | |
| 2006/0136340 A1 | 6/2006 | Park | |
| 2007/0005743 A1* | 1/2007 | Herzog | H04L 67/104 709/223 |
| 2007/0066364 A1* | 3/2007 | Gil | H04M 1/72561 455/566 |
| 2007/0073626 A1 | 3/2007 | Reeder et al. | |
| 2007/0076646 A1 | 4/2007 | Foster | |
| 2007/0083558 A1 | 4/2007 | Martinez | |
| 2007/0112628 A1 | 5/2007 | Lombardo | |
| 2008/0040370 A1 | 2/2008 | Bosworth et al. | |
| 2008/0071561 A1 | 3/2008 | Holcombe | |
| 2008/0189283 A1 | 8/2008 | Quoc et al. | |
| 2008/0249961 A1 | 10/2008 | Harkness et al. | |
| 2008/0288629 A1 | 11/2008 | Fisher et al. | |
| 2008/0313084 A1 | 12/2008 | Socolofsky | |
| 2009/0063427 A1 | 3/2009 | Zuta et al. | |
| 2010/0057517 A1 | 3/2010 | Jerkins, Jr. et al. | |
| 2010/0146443 A1 | 6/2010 | Zuckerberg et al. | |
| 2010/0161499 A1 | 6/2010 | Holcombe et al. | |
| 2010/0312654 A1 | 12/2010 | Parker | |
| 2011/0099096 A1 | 4/2011 | Shanley et al. | |
| 2011/0099640 A1 | 4/2011 | Risan et al. | |
| 2011/0106673 A1 | 5/2011 | Shanley et al. | |
| 2011/0119165 A1 | 5/2011 | Zee | |
| 2012/0014321 A1 | 1/2012 | Schmitz | |
| 2012/0059700 A1 | 3/2012 | Darbyshire | |
| 2012/0101948 A1 | 4/2012 | Aydar et al. | |
| 2012/0130857 A1 | 5/2012 | Thomas | |
| 2012/0227115 A1 | 9/2012 | Kidron | |
| 2012/0284803 A1 | 11/2012 | Wang et al. | |
| 2012/0290637 A1 | 11/2012 | Perantatos et al. | |
| 2012/0323349 A9* | 12/2012 | Khedouri | G06F 17/30094 700/94 |
| 2013/0080341 A1* | 3/2013 | Veeramachaneni | G06Q 50/184 705/310 |
| 2014/0095719 A1* | 4/2014 | Decker | H04L 61/00 709/226 |

FOREIGN PATENT DOCUMENTS

| | | |
|---|---|---|
| EP | 1 062 605 A1 | 12/2000 |
| EP | 1 301 881 A1 | 4/2003 |
| EP | 1 754 370 A4 | 8/2009 |
| EP | 2 120 141 A1 | 11/2009 |
| EP | 2 294 539 A1 | 3/2011 |
| EP | 2 350 970 A2 | 8/2011 |
| EP | 2 417 553 A1 | 2/2012 |
| EP | 2 417 571 A1 | 2/2012 |
| EP | 2 156 386 A4 | 5/2012 |
| EP | 2 465 072 A1 | 6/2012 |
| EP | 2 550 591 | 1/2013 |
| FR | 2 814 085 A1 | 3/2002 |
| GB | 2 368 245 A | 4/2002 |
| GB | 2 477 940 A | 8/2011 |
| JP | 11-205256 | 7/1999 |
| JP | 2000-036781 | 2/2000 |
| JP | 2002-109251 | 4/2002 |
| JP | 2002-334171 | 11/2002 |
| JP | 2002-358086 | 12/2002 |
| JP | 2003-177763 | 6/2003 |
| JP | 2003-337590 | 11/2003 |
| JP | 2007-287249 | 11/2007 |
| KR | 10-2009-0061666 | 6/2009 |
| WO | WO 00/42555 A1 | 7/2000 |
| WO | WO 02/45316 A2 | 6/2002 |
| WO | WO 2005/122571 | 12/2005 |
| WO | WO 2007/005538 A2 | 1/2007 |
| WO | WO 2007/044588 A1 | 4/2007 |
| WO | WO 2009/070724 A1 | 6/2009 |
| WO | WO 2009/143084 A1 | 11/2009 |
| WO | WO 2010/048159 A2 | 4/2010 |
| WO | WO 2010/048171 | 4/2010 |
| WO | WO 2010/117611 A1 | 10/2010 |
| WO | WO 2010/118152 A1 | 10/2010 |
| WO | WO 2011/019726 A1 | 2/2011 |
| WO | WO 2011/047326 A2 | 4/2011 |
| WO | WO 2011/086465 A1 | 7/2011 |
| WO | WO 2011/119775 A1 | 9/2011 |
| WO | WO 2012/050927 A3 | 4/2012 |
| WO | WO 2012/056326 A2 | 5/2012 |
| WO | WO 2012/064945 A3 | 5/2012 |
| WO | WO 2012/064947 A3 | 5/2012 |
| WO | WO 2012/092390 A2 | 7/2012 |
| WO | WO 2012/094415 A1 | 7/2012 |
| WO | WO 2012/094418 A1 | 7/2012 |
| WO | WO 2012/106515 A2 | 8/2012 |

OTHER PUBLICATIONS

DashBook, Royalty Software—DashBook for Book Royalties, Record Label Royalties, Publisher Royalties webpage, DashBook, printed from the internet at <http://dashbook.com/> on May 31, 2013, 2 pages.

Easy Royalties, Royalty Software webpage, Genesis Framework, Wordpress, copyright 2013, printed from the internet at <http://www.easyroyaltiesusa.com> on May 31, 2013, 2 pages.

Entomo Royalty Management, Challenges of Royalty Management and IP Protection webpage, Entomo, Inc., copyright 2013, printed from the internet at <http://www.entomo.com/channel-data-solutions/royalty-management/> on May 31, 2013, 2 pages.

Epicor Enterprise brochure, Royalties, Epicor Software Corporation, copyright 2004, 2 pages.

Facebook, Activity Feed—Facebook Developers webpage, Facebook, copyright 2013, printed from the internet at <https://developers.facebook.com/docs/reference/plugins/activity/> on Jun. 4, 2013, 2 pages.

HCL Technologies—Royalty Management webpage, HCL Technologies Limited, copyright 2013, printed from the internet at <http://hcltech.com/enterprise-application-services/oracle/royalty-management> on May 31, 2013, 2 pages.

Infosys® Royalty Management Solution brochure, Infosys® Limited, copyright 2012, 2 pages.

Intellectual Property Ledger, G3 Global webpage, GB Global, copyright 2013, printed from the internet at <http://www.g3g.com> on May 31, 2013, 3 pages.

Kobalt Brochure, Next Generation Portal User Guide Version 1, Kobalt Music Group Ltd., copyright 2009, 20 pages.

Korrect Royalty Software, Product webpage, Korrect Royalty Software, copyright 2009, printed from the internet at <http://www.korrectsw.com/KorrectProducts.html> on May 31, 2013, 2 pages.

MACCS International, RR Rights & Royalty Management— MACCS webpage, MACSS International, copyright 2013, printed from the internet at <http://www.maccs-software/maccs/rights-royalty-management/> on May 31, 2013, 4 pages.

MetaComet Systems, Manage Music & Song Royalties Accurately and Efficiently with MetaComet Royalty Tracker System web page, MetaComet Systems, copyright 2012, printed from the internet at <http://www.metacomet.com/music-royalty-software-features/> on May 31, 2013, 3 pages.

(56) References Cited

OTHER PUBLICATIONS

Missing Link Music, Royalty Collection—Fast, Accurate and Transparent webpage, Missing Link Music Company, copyright 2013, printed from the internet at <http://www.missinglinkmusic.com/administration-publishing-services/> on May 31, 2013, 3 pages.
Mixpanel, See the actions your customers have taken in your mobile app webpage, Mixpanel, printed from the internet at <https://mixpanel.com/activity-feed/> on Jun. 4, 2013, 3 pages.
mySAP Media, Media Industry Solution for Intellectual Property Management, SAP AG, copyright 2002, 28 pages.
NetSuite Incentive Management brochure, NetSuite, copyright 2011, 2 pages.
Oracle: Enabling Rights, Royalties and Settlement for Content Distribution, Oracle, YEAR, pp. 1-37.
Pirean, Universal Music Publishing Group—Royalty Portal, Security Access and Verification for RoyaltyWindow.com, Pirean Limited, copyright 2009, 2 pages.
PRS for Music, Disputes and Duplicate Claims webpage, PRS for Music, copyright 2013, printed from the internet at <http://www.prsformusic.com/creators/memberresources/how_it_works/disputesandduplicateclaims/pages/disputesandduplicateclaims.aspx> on May 31, 2013, 2 pages.
REAL Software Systems, REAL Software Systems—contract management & accounting for licensing deals webpage, REAL Software Systems, LLC, printed from the internet at <http://www.realsoftwaresystems.com/> on May 31, 2013, 1 page.
RightsLogic® Content & Asset Lifecycle Management for Media, RSG Media—Rights Management, Intellectual Property Management, Business Rights Management webpage, RSG Systems, Inc., copyright 2003-2010, <printed from the internet at <http://www.rsgmedia.com/products/rightslogic-rights-magagement/rightslogic-content-and . . . > on May 31, 2013, 4 pages.
Royalty Producer webpage, Officer Solutions, copyright 1996-2013, printed from the internet at <http://www.officer.de/> on Jun. 4, 2013, 10 pages.
Symphonic Distribution, Royalties—Digital Music Distribution—Sell Your Music Online webpage, Symphonic Distribution, printed from the internet at <http://www.symphonicdistribution.com/faq/accounting/> on May 31, 2013, 6 pages.
Traction® Software, Traction Software—Connected Work webpage, Traction Software, Inc., printed from the internet at <http://traction.tractionsoftware.com/> on Jun. 4, 2013, 2 pages.
Weiss, David, "TuneSat Launches Online Portal, Enables Immediate Signup for All Music Rightsholders," SonicScoop, Oct. 9, 2011, printed from the internet at <http://www.sonicscoop.com/2011/10/09/tunesat-launches-online-portal-enables-immediate . . . > on May 31, 2013, 6 pages.
YouTube, Channel Posts—YouTube Help webpage, YouTube, LLC, copyright 2013, printed from the internet at <http://support.google.com/youtube/bin/answer.py?hl=en&answer=118693> on Jun. 4, 2013, 1 page.

\* cited by examiner

ANALYSIS AND DISPLAY OF A PRECIS OF GLOBAL LICENSING ACTIVITIES

1. TECHNICAL FIELD

The present description relates generally to a system and method, generally referred to as a system for provisioning views of up to date ongoing activities associated with the works of a client by territory and content.

2. BACKGROUND

Many publishing companies provide clients royalty administration and rights management (RARM) services. Royalty administration services may include features such as those provided by Counterpoint™ which is a software company that sells software for the management and accounting of royalties, and Royalty Share™ (owned by Google®). However, current royalty administration systems and services use incomplete and inefficient solutions to configure and deliver account activity information to clients. Historically, tracking global registration information, as well as other client account information, has been problematic because of the various disparate manual and automated ways third party collectors process registrations and status the progress of registrations. Accordingly, delivering account activity information to clients is complex and further complicated by the frequency and amounts of data that may be delivered to the client that may overwhelm and/or may be inappropriate to deliver to the client.

SUMMARY

In one embodiment, a method provides a client with a royalty administration and rights management (RARM) activity feed from a system that identifies activity status for the works of the client. The method may include in various embodiments receiving, through a communications interface connected to a network, RARM data from geographically disparate partners; reformatting the royalty administration and rights management (RARM) data into a unified format by comparing the RARM data from each partner with respective partner rules for one or more activity types. The method may include assigning activity codes to the RARM data to obtain currently assigned activity codes, identifying a user configurable reporting period, differences and calculating a number of duplications between one or more previously identified activity codes and the currently assigned activity codes. The method may include defining an activity feed display; communicating the defined activity feed display to a screen formatter for display to the client. The method may further include the activity codes identifying the activity types, where each activity type comprises lifecycle stages, and where each lifecycle stage is defined by a start time and an end time.

In another embodiment, a system provides a display with a royalty administration and rights management (RARM) activity feed that identifies activity status for the works of a client. The system in various embodiments may include a display interface, a communications interface, and a non-transitory memory coupled with a processor, wherein the communications interface configured to provide communications between the system and geographically disparate partners systems. The memory may have stored thereon processor executable instructions that when executed by the processor cause the processor to: receive, through the communications interface connected to a network, RARM data from the partners; reformat the RARM data into a unified format by comparing the RARM data from each partner with respective partner rules for one or more activity types; assign activity codes to the RARM data to obtain currently assigned activity codes, where the activity codes identify the activity types, where each activity type comprises lifecycle stages, where each lifecycle stage is defined by a start time and an end time; identify, for a user configurable reporting period, differences and calculating a number of duplications between one or more previously identified activity codes and the currently assigned activity codes; define an activity feed display; and communicate the defined an activity feed for display.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
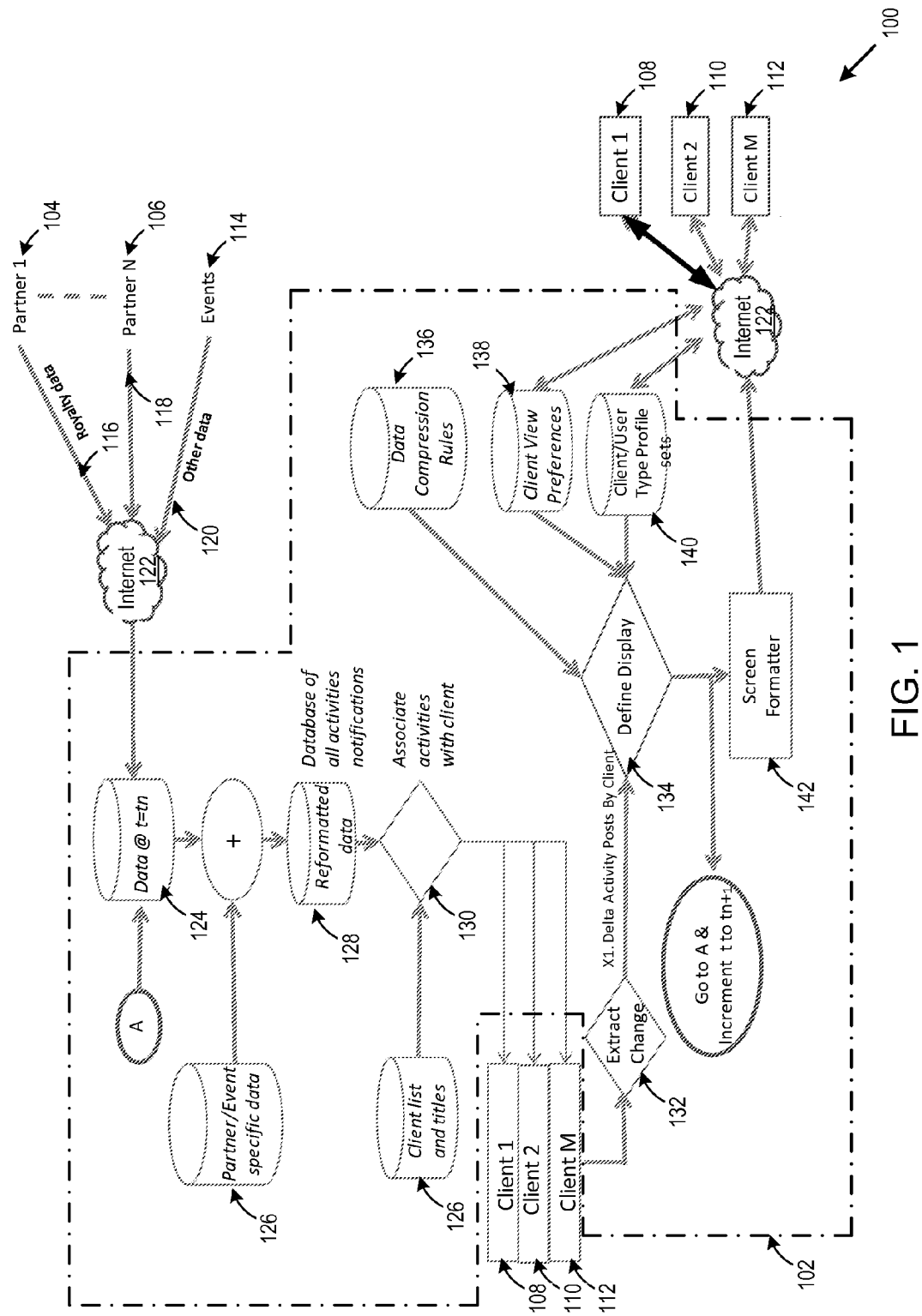
FIG. 1 illustrates a royalty administration and rights management system configuration.

For purposes of discussion and illustration herein, this system and method are referred to generally as a system for clients to view royalty administration and rights management (RARM), including registration information for the works of clients. Various embodiments of the present invention include a system and method that, among other capabilities, provides a web portal customizable user-centric display of data subsets associated with a user. The system may be illustratively referred to generally as a royalty administration and rights management (RARM) system.

The system provides a client a royalty administration and rights management (RARM) activity feed that identifies activity status for the works of the client. The RARM system comprises: a display interface; a communications interface;

and a non-transitory memory coupled with a processor. The communications interface is configured to provide communications between the RARM system and geographically disparate partners systems. The memory stores processor executable instructions that when executed by the processor cause the processor to: receive, through the communications interface connected to a network, RARM data from the partners; reformat the RARM data into a unified format by comparing the RARM data from each partner with respective partner rules for one or more activity types; and assign activity codes to the RARM data to obtain currently assigned activity codes. The activity codes identify the activity types, where each activity type comprises lifecycle stages, and each lifecycle stage may be defined by a start time and an end time. The RARM system identifies, for a user configurable reporting period, differences and calculates the number of duplications between one or more previously identified activity codes and the currently assigned activity codes. The number and duration of lifecycle stages for each activity type may vary depending on the characteristics of the client, the ingestion date (e.g., start and or registration date) into the system of one or more works directed to the activity type for one or more clients, the duration of the client's account or any combination thereof.

The RARM system may define, using the instructions, an activity feed display; communicate the defined an activity feed display to a screen formatter; and communicate, using the screen formatter, the activity feed display to the client. The system applies to the currently assigned activity codes: data compression rules (DCRs), where the compression rules apply a configurable data count minimum value and data count maximum value for each lifecycle stage for each activity type; client view preferences; and client type profile, user type profile or both. The system may calculate, using an activity feed modeler, for each lifecycle stages for each activity type, the start time and the end time and the data count minimum value and the data count maximum value.

The RARM data may include values that satisfy (e.g., exceed) one or more of a plurality of predetermined (e.g., user configurable) metrics or a plurality of predetermined (e.g., user configurable) criteria. The RARM data may, include data associated with: registration, distribution and transmission of rights owned or controlled by clients; registration, distribution and transmission of content owned or controlled by clients in physical or digital form; royalties earned due to the exploitation of rights owned or controlled by clients, usage data associated to the exploitation of rights owned or controlled by clients; new instances of use of content associated with rights owned or controlled by clients; requests for usage, adaptation or sampling of clients rights; actions required by the client in order to facilitate the administration of rights owned or controlled by clients; payments associated with the client account; changes in key details associated with the client account; data, not directly associated with usage, but relevant in indicating popularity of rights owned or controlled by clients on a global basis; information, specific or general, on the general theme of administration of rights; notifications of work and effort undertaken by system associated with rights owned or controlled by clients on a global basis.

Although in one implementation the system assumes that the data analysis and reformatting is executed using a programmable computer, an alternative implementation may implement a non-programmable hardware solution (e.g., state machine) that may be constructed in order to carry out the same or similar functionality as the system implementation. At least one advantage of the non-programmable state machine implementation is that the data analysis and reformatting may be executed more rapidly and with lower power consumption, while at least one of the disadvantages of using a state machine to conduct the operations is that the non-programmable state machine may be less flexible to modifications than the computer programmable solution.

Embodiments of the system and method may be understood by reference to figures illustrating various aspects or embodiments of the invention.

Referring now to FIG. 1, a royalty administration and rights management system configuration 100 is illustrated. The system 102 receives RARM information, including royalty data and registration data, reformats (e.g., registration statuses are reformatted in line with partner rules (e.g., registration rules), and identifies (e.g., extracts) changes in the activities. For example, the system may receive from a partner a royalty payment for a work for a particular territory in the morning and another royalty payment for the work for the territory in the afternoon. The system identifies duplicate registration activities and suppresses notifications to the client of such redundant information. Instead, the system notifies the user (client) of updated information over information with no change in status. The system may report a change in status, according to the life stages of the activity type, from 'not registered' to In-progress' and not report again until the status changes, for example, from In-progress' to 'complete'.

The activity types include: new works entered; new products entered; new recordings entered; work registration updates comprising work registration updates activity sub-types: sent; in-progress; and confirmed; product registrations comprising product registrations activity sub-types: sent; in-progress; and confirmed; duplicates comprising duplicates activity sub-types: created; updated; closed; and action required; royalty payment; work pitched comprising Work pitched activity sub-types: pitched; hold; and cut; synchronization status comprising synchronization status activity sub-types: pitched; agreed; licensed; and paid; adaptation request comprising adaptation request activity sub-types: opened; closed; and action required; advance paid; new action posted; new action completed; RARM system news; industry news; user RARM system session time; product sales great than a product sales threshold; advances paid; advance amount updated; and multimedia play counts greater than a configurable Multimedia play counts threshold.

The partner rules may include rules for each activity type, including: registration rules; duplicate claims rules; adaptation requests rules; and synchronization rules. The system may synchronize receipt of RARM data with the partners based on client preferences, including activity feed preferences for a configured time period, where the partners responsively communicate the activity feed data based on the activity feed preferences.

The RARM data includes royalty data, and the RARM system associates the royalty data with the client by identifying a work to which the royalty data applies, type of rights held by the client for the work, and attributes of the royalty data. The system communicates, to the client, a notice of registration of a work in a territory.

The life cycle stages of the adaptation request activity type may comprise: receiving, in the RARM data, an adaptation request from another to produce an adaptation of a work of the client; communicating, to the requester, a request for required adaptation request information; receiving, from the requester, the required adaptation request information; ingesting the adaptation request information; generating an adaptation request activity feed, where the adaptation request activity feed that communicates to the client a request for an action by the client to review, provide a decision or both, where the decision includes: approve request; or decline request. The adaptation request information describes the nature of the proposed adaptation of the work of the client and the terms of agreement the requester proposes under which the requester may adapt the work. See description of FIG. 2 below regarding the client configurable activity feed notification rules that the system may use to determine the amount and frequency over which a type of data (e.g., activity type) is communicated to the client is discussed further below.

The system may configure the parameters of the activity feed, within the scope of the configuration set by the system. The system may allow the client to configure the amount and frequency of data communicated to the client and the sub-client (e.g., representatives of the client) within the scope of the configuration set by the client. The sub-client may be allowed to configure the amount and frequency of data communicated to the sub-client. Accordingly, the system determines the characteristics of the client to automatically configure the amount and frequency of activity data communicated to the client and the sub-client (e.g., client representative).

For example, the system models a mature artist with a global market and a large number of works in one or more catalogues of data is to calculate a forecasted amount and frequency of data to be communicated to the system for the client by the partners and/or other sources. While the system may model differently a new artist with a target market in France and a smaller catalogue of work relative to the mature artist, and thus, the system configures the activity types for different client profiles and/or user profiles. The system may model the client profiles and/or user profiles in order to configure the activity feed and/or to provide default configurations optimized for the characteristics of the client.

The system and method provide an efficient and effective way to provision views of up to date ongoing activities associated with the works of a client (e.g., global registration of rights relating to licensing of multimedia material) by territory and content. The system provides the client a way to configure a selection précis of up to date activities and extract from a full complement of data (e.g., royalty administration and rights management life cycle metrics) received from global partners responsible for collecting work rights information. The system reformats the data received from partners into a unified format, performs an extraction/compilation of an optimized summary of the data, and filters the summarized data according to the predetermined client customized format.

The system provisions one or more simplified views of up to date (real-time and/or as configured by the system and/or user) activity on the client account. The activities may include, but are not limited to: global royalty activities, account actions and account events associated with a client's work by territory and progress. The précis activity may be selected by clients based on the interest of the client, as well as specific privileges defined within the system and extracted from a full complement of data received from a one or more sources including but not limited to global partners and third parties. The system acquires (receives) from partners and third parties royalty data and other data at predetermined times (e.g., on an ongoing basis, daily, weekly, monthly, yearly), reformats the received data to an unified format based on rules associated with the partners or companies, associates activities to the client, extracts/compiles an optimized summary of changes in the data to the last update, and filters the summarized data to correspond to the predetermined format and/or view selected by the client and/or determined by client privileges, and/or user privileges (e.g., representative of the client). The system may display the summarized data to the client filtered to correspond to the predetermined format.

The system may communicate an audible (e.g., all or a configurable portion of a song), haptic feedback (e.g., different feedback for different works and work types), visual indication or any combination thereof (e.g., communicated to the client through a smart device) that identify the filtered summarized data by the nature of the data (e.g., by work, type of work, by territory, and/or any combination of criteria distinguishing the data) displayed to the client. The audible indication may be a user selectable audio clip, the haptic feedback may be a user selectable beat of a song or rhythm and the visual indication may be a user selectable multimedia clip (e.g., of all or a configurable portion of a work of the client) identified by the processed data displayed to the client.

The activity feed provides the client with a feed of activities/events, scrolling information, which is constantly being updated, as a ticker feed. The system provides the clients (users) the ability to select and format information to provide a feed in order to optimize delivery of the activity feed information based on the manner of delivery to the client, frequency, equipment used to receive communication by the client, the inclusion of user account privileges to allow predetermined access to selected activities; the aggregation of wide ranging data formats into a useful optimized format.

The system provides a way to avoid client overload if every royalty transaction was transmitted and/or displayed, the system is designed to aggregate data into meaningful subsets that provide adequate tracking of activities so that the usefulness and diversity of information is not lost to the user. These less frequent, high interest, sub elements are selected by a predetermined template.

The system also provides a client-controlled filter that gives the client options to reduce or increase the amount of data shown or to change the method by which the data is displayed or to change the emphasis of the data selector. The client interface also includes the ability for the user to dictate summary emails focused on individual activities to be sent to their inbox. These emails are programmable by activity type and time period (e.g., the client may dictate the time period by the expected time the client believes the client may receive a summary for each activity.

The client view preferences selected filters are communicated back to the system and subsequently be utilized by the system to select and compress the incremental data. The class of the user/client, the client view preference, the client/user profile, or any combination thereof, may modify the type and quantity of data that is transmitted to the user/Client. The user/Client can for each type of activity notification select to turn it on (or off) or alternatively the user/Client can select a frequency of updating the scrolling data. The Client can also, select or deselect if the Activity Notification should sent as email for off line tracking.

The royalty administration and rights management (RARM) system provides a client a royalty administration and rights management activity feed that identifies activity status for the works of the client. The RARM system comprises: a display interface; a communications interface; and a non-transitory memory coupled with a processor. The communications interface is configured to provide communications between the RARM system and geographically disparate partners systems. The memory stores processor executable instructions that when executed by the processor cause the processor to: receive, through the communications interface connected to a network, RARM data from the partners; reformat the RARM data into a unified format by comparing the RARM data from each partner with respective partner rules for one or more activity types; assign activity codes to the RARM data to obtain currently assigned activity codes, where the activity codes identify the activity types, where each activity type comprises lifecycle stages, where each lifecycle stage is defined by a start time and an end time; identify, for a user configurable reporting period, differences and calculating a number of duplications between one or more previously identified activity codes and the currently assigned activity codes; define, using the instructions, an activity feed display; communicate the defined an activity feed display to a screen formatter; and communicate, using the screen formatter, the activity feed display to the client. The system applies to the currently assigned activity codes: data compression rules, where the compression rules apply a configurable data count minimum value and data count maximum value for each lifecycle stage for each activity type; client view preferences; and client type profile, user type profile or both. The system may calculate, using an activity feed modeler, for each lifecycle stages for each activity type, the start time and the end time and the data count minimum value and the data count maximum value.

The activity types, as show below in Table 1, may include: new works entered; new products entered; new recordings entered; work registration updates comprising work registration updates activity sub-types: sent; in-progress; and confirmed; product registrations comprising product registrations activity sub-types: sent; in-progress; and confirmed; duplicates comprising Duplicates activity sub-types: created; updated; closed; and action required; royalty payment; work pitched comprising Work pitched activity sub-types: pitched; hold; and cut; synchronization status comprising synchronization status activity sub-types: pitched; agreed; licensed; and paid; adaptation request comprising Adaptation request activity sub-types: opened; closed; and action required; advance paid; new action posted; new action completed; RARM system news; industry news; user RARM system session time; product sales great than a product sales threshold; advances paid; advance amount updated; and multimedia play counts greater than a configurable Multimedia play counts threshold.

The partner rules may include rules for each activity type, including: registration rules; duplicate claims rules; adaptation requests rules; and synchronization rules. The system may synchronize receipt of RARM data with the partners based on client preferences, including activity feed preferences for a configured time period, where the partners responsively communicate the activity feed data based on the activity feed preferences.

The RARM data includes royalty data, and the RARM system associates the royalty data with the client by identifying a work to which the royalty data applies, type of rights held by the client for the work, and attributes of the royalty data. The system communicates, to the client, a notice of registration of a work in a territory.

The life cycle stages of the adaptation request activity type may comprise: receiving, in the RARM data, an adaptation request from another to produce an adaptation of a work of the client; communicating, to the requester, a request for required adaptation request information; receiving, from the requester, the required adaptation request information; ingesting the adaptation request information; generating an adaptation request activity feed, where the adaptation request activity feed that communicates to the client a request for an action by the client to review, provide a decision or both, where the decision includes: approve request; or decline request. The adaptation request information describes the nature of the proposed adaptation of the work of the client and the terms of agreement the requester proposes under which the requester may adapt the work.

Partners 1 (104) through Partner N (106) represent the commercial interest of a client 1 (108), client 2 (110) through client M (112) within one or multiple geographic regions. The commercial interests potentially include the registration within a geographic region of legal rights to content, the sale or sublicensing to third parties of rights to modify content, the sale of access to content, tracking and reporting revenue associated with content (such as advertising or music), the collection of royalty income associated with licensing of content, and reporting on an ongoing basis of information relating to the commercial interests of the client(s). The reporting from these partners may take one of various formats (e.g., a spreadsheet, PDF file, word file, electronic file or by written communications). In some instances the partner may communicate (e.g., transmit) information based on the Common Royalty Distribution (CRD) format and/or alternatively in a bespoke format. The CRD format includes details of how to interpret the different data, including for example the type of licensee, the owners/author(s), royalty amount, the territory, the title, and usage. Also, the format defines the order in which the data may be sent to one or more representatives of the client so that the data may be consistently ingested.

Some number of clients may desire to obtain information regarding the status of rights and royalties for the client on an ongoing basis or periodically. Some of the data generated by partners may not be of importance and/or meet the criteria predefined by the client and/or may be of a type that the associates of the clients may be authorized to receive. Thus, such updates of information generated by partners is processed, compressed and distributed to the client in an optimum manner.

Some partners may not utilize the same format when communicating (e.g., supplying) information (e.g., global registration status or data showing royalty revenues/characteristics). Also, the system may maintain a regular feed and track changes in information by storing data from partners in a memory at configurable intervals (t). Some information may be supplied from partners in electronic format, by web based systems, fax and/or other forms. Therefore, the system may use data aggregation and reformatting based on partner event and specification rules that describe the communication (e.g., transmission) method used by each of the partners to reformat the data into a unified electronic database with common attributes.

The system 102 may receive from partners (104, 106) and/or events 114 the RARM data (116, 118) and other data (120) communicated via a network 122 (e.g., internet) to a unified database of activities (124) contains information relating to the clients. The system 102 analyzes the activities in view of the partner rules and event rules 126 to obtain the RARM data in a unified format (128). The system 102 compares the partner communicated data to a stored list of titles 126 associated with clients (130), and may attribute each part of the information contained within the unified database to a client 1 to M (108, 110, 112) and stored in a memory (e.g., separate associated memories).

The system 102 extracts changes (e.g., activity status) from the RARM data in a unified format (132). Some of the data associated with a client may not be new information and thus only information that has not previously been updated to the client is extracted for communication to the client. The system 102 may define the activity feed display (134) by applying a data compression rule set (136), client view preferences (138) and client profile and user type profile (140). Similarly, some of the information may not be of the level of importance that corresponds to the predefined need of the client contained within a data compression rule set and thus some pieces of information may be compressed into a form which corresponds to the needs of the client. Similarly, some information may not correspond to the type of information on which the client wishes to gain regular updates. Thus, the data of a type and/or category is selected within the display definer (134) as predefined by the client within a client view preferences repository (136). Similarly, some information may not correspond to the type of information which the client desires to have presented to representatives of the client with user access. The system 102 communicates the defined activity feed display (134) to a screen formatter 142 that formats the activity feed display to the client (108, 110, 112). Data that meets the client's predefined criteria (for example granularity, type and access rights) may be passed to the screen formatter for formatting into a form that is compatible with the equipment and format requested by the associated client 1 or M. Once the associated activities of the clients 1 through M have been processed and updated, the time event counter is incremented to t1 and a new set of information is requested and/or received from the partners 1 through N or alternatively from specific events (112).

Figure 2:
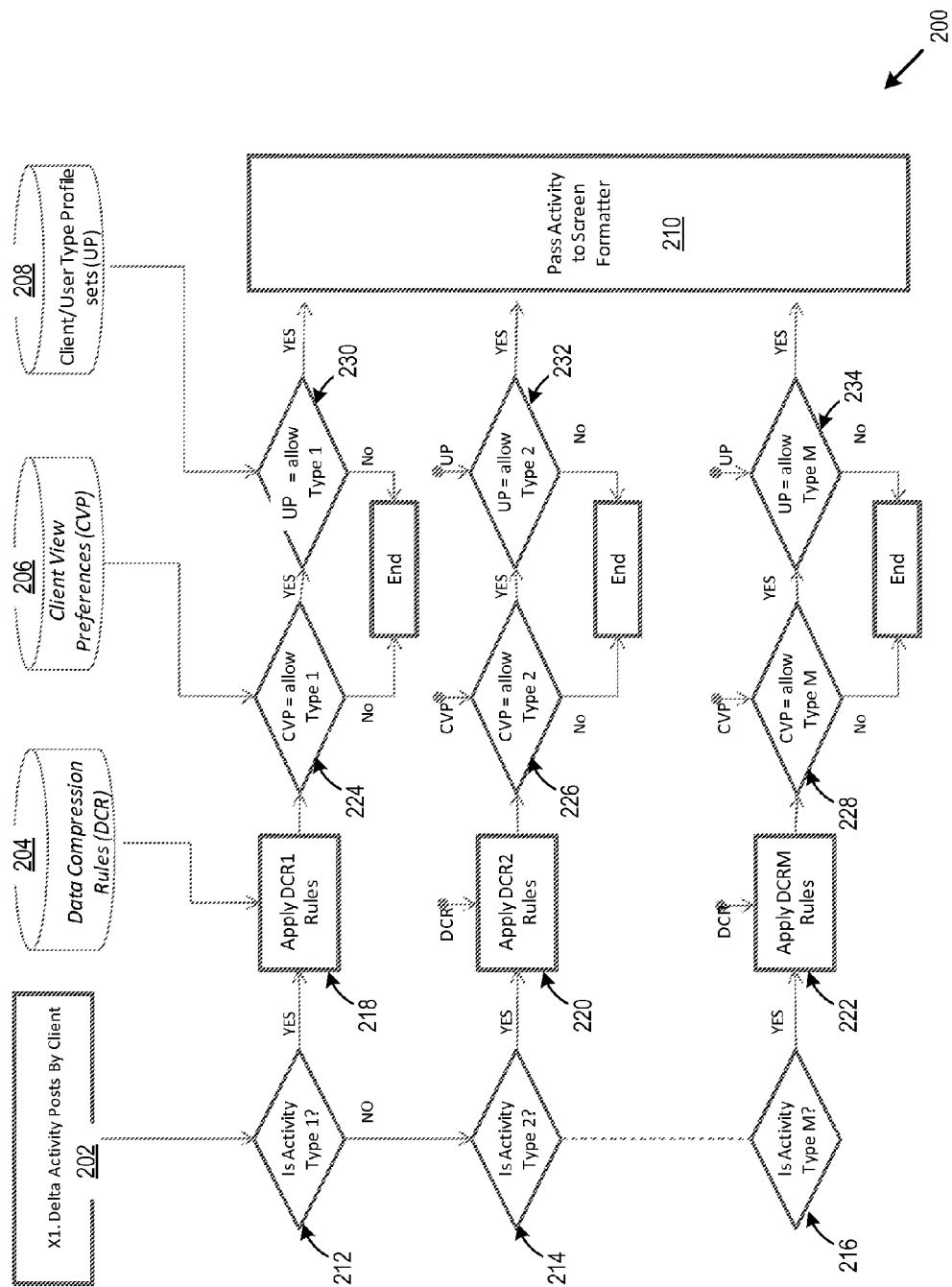
FIG. 2 is a flowchart that illustrates an embodiment of the logic instructions the global registration system may execute to define the display.

FIG. 2 is a flowchart 200 that illustrates an embodiment of the logic instructions the RARM system may execute to define the activity feed display. The RARM system performs data analysis on the RARM data (202) received from the partners, and applies data compression rules 204, client view preferences 206 and client type profiles and/or user type profiles 208 to generate an activity feed display formatted by a screen formatter 210. Activities are communicated to the system 102, and the system 102 identifies the client corresponding to each activity. The system 102 analyzes the activity type (212, 214, 216) (e.g., royalty, synchronization, adaptation), applies the compression rules 204 (218, 220, 222) (e.g., suppress duplicate information and frequency of delivery of information), client view preferences 206 (224, 226, 228) and client type profiles and/or user type profiles 208 (230, 232, 234) to determine the amount and frequency over which a type of data (e.g., activity type) is communicated to the client. The system 102 may track synchronization pitch activities engaged in by one or more publishers on behalf of the client. The activity feed may identify the works that were pitched by territory for a client. Each type of activity feed data (e.g., an adaptation request) may employ distinct processing (e.g., ingesting the adaptation request, analyzing the request, and generating a description of the adaptation and terms proposed to adapt the work) completed to generate the activity feed communicated to the client.

Table 1 illustrates the types of activity feeds.

TABLE 1

| Activity Feed Types | |
| --- | --- |
| Activity Type | Activity Sub-Type |
| New works entered | |
| New products entered | |
| New recordings entered | |
| Work registration Updates | Sent |
| | In Progress |
| | Confirmed |
| Product registrations | Sent |
| | In Progress |
| | Confirmed |
| Duplicates | Created |
| | Updated |

TABLE 1-continued

| Activity Feed Types | |
| --- | --- |
| Activity Type | Activity Sub-Type |
| | Closed |
| | Action Required |
| Royalty payment | |
| Work pitched | Pitched |
| | Hold |
| | Cut |
| Synchronization status | Pitched |
| Activity Type | Activity Sub-Type |
| | Agreed |
| | Licensed |
| | Paid |
| Adaptation Requests | Opened |
| | Closed |
| | Action Required |
| Account payment | |
| Advance Paid | |
| New Action Posted | |
| New Action Completed | |
| RARM System News | |
| Industry News | |
| User RARM session time | |
| Product Sales > Threshold | |
| Advances Paid | |
| Advance Amount updated | |
| Multimedia Play Counts > Thresholds | |

Table 2 illustrates activity feed notification rules for month N that indicate a ratio of dmax/'X' that specifies the maximum number of data counts received during a configured period 'X' to use in a type of activity feed.

TABLE 2

| Activity Feed Notification Rules | | |
| --- | --- | --- |
| Activity Type | Activity Sub-Type | Month N |
| New works entered | | 25/24 |
| New products entered | | 25/24 |
| New recordings entered | | 25/24 |
| Work registration Updates | Sent | 25/24 |
| | In Progress | 25/24 |
| | Confirmed | 100/24 |

Table 3 illustrates activity feed notification rules for month M.

TABLE 3

| Activity Feed Notification Rules | | |
| --- | --- | --- |
| Activity Type | Activity Sub-Type | Month M |
| New works entered | | unlimited |
| New products entered | | unlimited |
| New recordings entered | | unlimited |
| Work registration Updates | Sent | 25/24 |
| | In Progress | 25/24 |
| | Confirmed | 100/24 |

The system may communicate an audible (e.g., all or a configurable portion of a song), haptic feedback (e.g., different feedback for different works and work types), or visual indication or any combination thereof (e.g., communicated to the client through a smart device) that identify the filtered summarized data by the nature of the data (e.g., by activity feed type, work, type of work, by territory, and/or any combination of criteria distinguishing the data) displayed to the client. The audible indication may be a user selectable audio clip, the haptic feedback may be a beat of a song or rhythm and the visual indication may be a user selectable multimedia clip (e.g., of all or a configurable portion of a work of the client) identified by the processed data displayed to the client.

Figure 3:
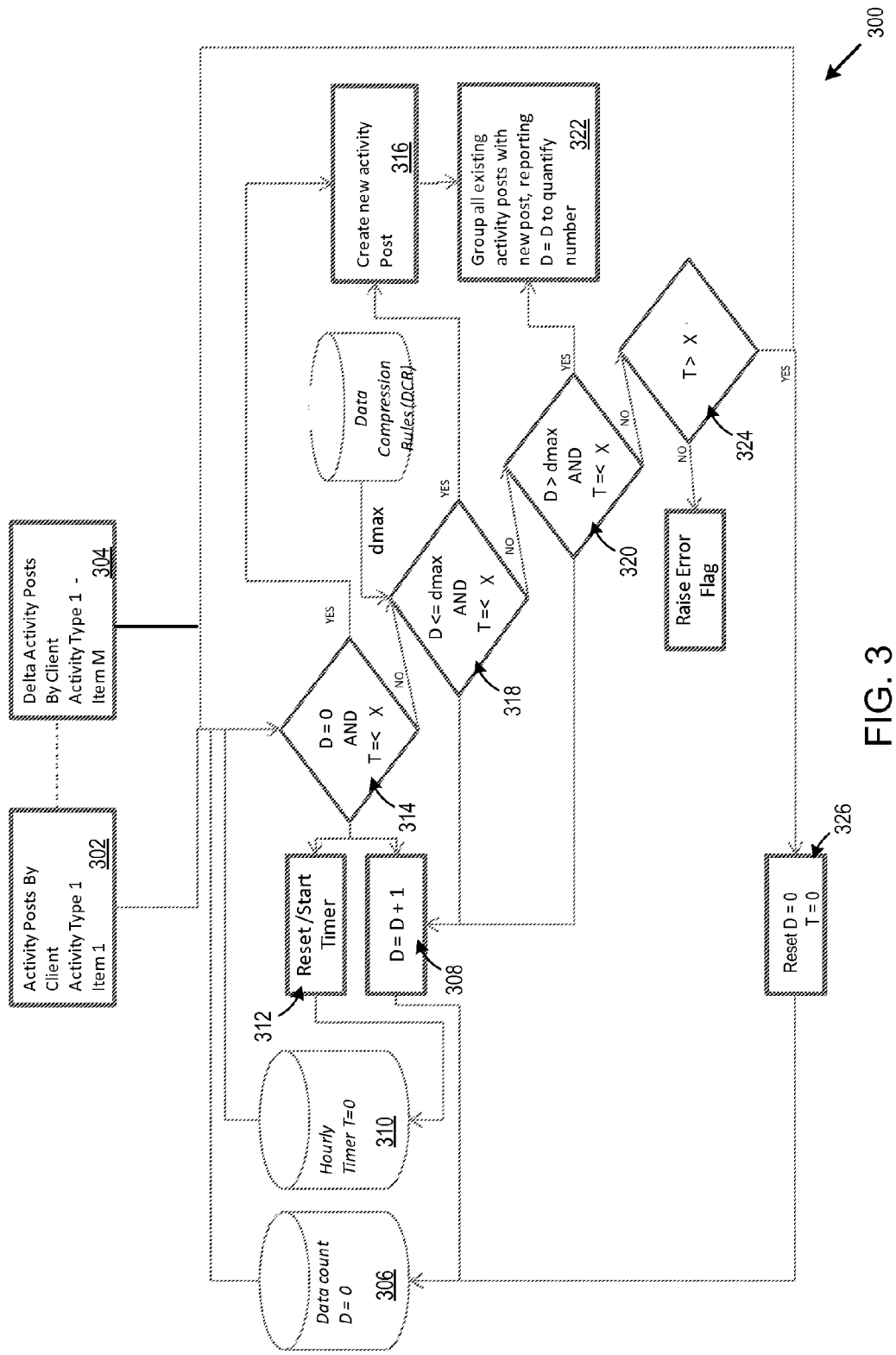
FIG. 3 is a flowchart that illustrates an embodiment of the logic instructions the system may execute to apply data compression rules.

FIG. 3 is a flowchart 300 that illustrates an embodiment of the logic instructions the system 102 may execute to apply data compression rules. The system, for each type of activity feed, retrieves the number of type activity feeds previously received within a configurable time period 'X'. The system may provide configurable dmin (minimum data count) and dmax (maximum data count) that define minimum, maximum and/or ranges of data counts to use to determine the activity feeds to communicate to the client.

The system 102 compares the current activity posts (e.g., activity data extracted from the RARM data) (302, 304) to previously processed activity posts to determine whether a number of duplicate activity posts exist. The system 102 stores the occurrence of each activity type (e.g., including the data count 306 in a repository 308) occurring for a configurable period of time 'X' (e.g., activities occurring during a 24 hour period) received by the system from the partners. The system 102 may employ a timer (310, 312) to monitor the number of activity posts of each type received in the period of time 'X'.

For example, for a first activity post for a time 'T' less than or equal to a configured period of time 'X' (314), the system 102 creates a new activity post (316) communicated to the screen formatter for display to the user, and the system 102 increments the data count by one to count the activity post (308). For subsequent activity posts of the same activity type as the first activity post, the system 102 determines the number of subsequent activity posts that duplicate the first activity post. When the number of duplicate occurrences of the activity post is less than or equal to a maximum number of occurrences for the number of duplicate occurrences when the time 'T' less than or equal to a configured period of time 'X' (318), then the system 102 increments the data count by one to count the activity post and creates a new activity post (316). When the number of duplicate occurrences of the activity post is greater than the maximum number of occurrences for the number of duplicate occurrences when the time 'T' less than or equal to a configured period of time 'X' (320), then the system 102 increments the data count by one to count the activity post and communicates the existing posts with the new activity post (322) to the screen formatter. When time 'T' is greater than the configured period of time 'X' (324), then the system resets to zero the count of the number of duplicate occurrences of the activity post 'D' and the time 'T' (326).

The system may include an activity type feed modeler that models the types of activities, life cycle stages of each activity type and the frequency of each activity type, in order to calculate model amounts data and frequency of activities feeds to communicate to the user. The activity type feed modeler may include one or more mathematical algorithms trained to forecast characteristic about forecasted activity feeds. The activity type feed modeler may also define model look up and/or comparison values. For example, the activity type feed modeler may define a model ingestion period for catalogues with a small, medium and large number of works of clients so that the system calculates model start times and end times for each process life cycle stage of each activity type. The system 102 may limit the number of activities feeds (e.g., notifications) based on a calculated model dmin and/or dmax (data counts) (e.g., dmin of zero, dmax of 25 notifications, or a range of notifications between a dmin and dmax) regarding new works entered in a configurable time period 'X' (e.g., 24 hour period) until the forecasted end time of the ingestion period for the catalogue with a large number of works. The system may adjust the dmin, dmax and/or time period 'X' for each activity type based on the activity type, life cycle stages of the activity type and the forecasted frequency of activity feeds for the activity type.

The activity type feed modeler may limit the activity type feeds, including new works entered, new products entered and new recordings entered, during the model ingestion period forecasted for each catalogue size of a small, medium and large number of works of clients in order to efficiently ingest catalogues into the system without overwhelming the system and/or the user (client). Similarly, the activity type feed modeler may limit the activity type feeds, including work registration updates, product registrations, during the model ingestion period forecasted for each catalogue size. The activity type feed modeler may limit the activity type feeds based on the forecasted desire of the client to receive particular information. The activity type feed modeler may determine that duplicate activity types are less likely to generate excessive feeds. The activity type feed modeler may allow an unlimited number of duplicate activity type feeds after an initial period because the existence of duplicates may be key information to the client during the life cycle of the corresponding work. The activity type feed modeler may allow an unlimited number of duplicate activity type action require sub-activity feeds throughout the life cycle of a work in order to resolve such issues requiring action. The activity type feed modeler may provide notification of royalty earnings for each partner-territory per day based on a configurable duration (e.g., 24 hours) of time elapsed based on client-user location, which may result in multiple partner territory notifications. The activity type feed modeler may provide unlimited number of activity type notifications of works pitched, synchronization status pitched and paid, account payments, advances paid, and advances amount updated, and may repeat these activity notifications multiple times to ensure clients observe the notifications, in order to keep the notifications in a current view (e.g., front page of a user interface) until the user (client) logs into the system. The activity type feed modeler may provide an unlimited number of activity type notifications that the modeler forecasts as infrequent and thus unlikely to overwhelm the system or the client. The system may feed industry news main content of feed. The system may use the user login/time on portal activity type notification to promote the client's and client's representatives use of the portal. During the ingestion period (e.g., for a new client) the system may generate product sales greater than a product sales threshold activity type notification for existing products, while later in the life cycle of the client relationship the product sales greater than a product sales threshold activity type notification may identify new product sales over existing product sales.

Figure 4:
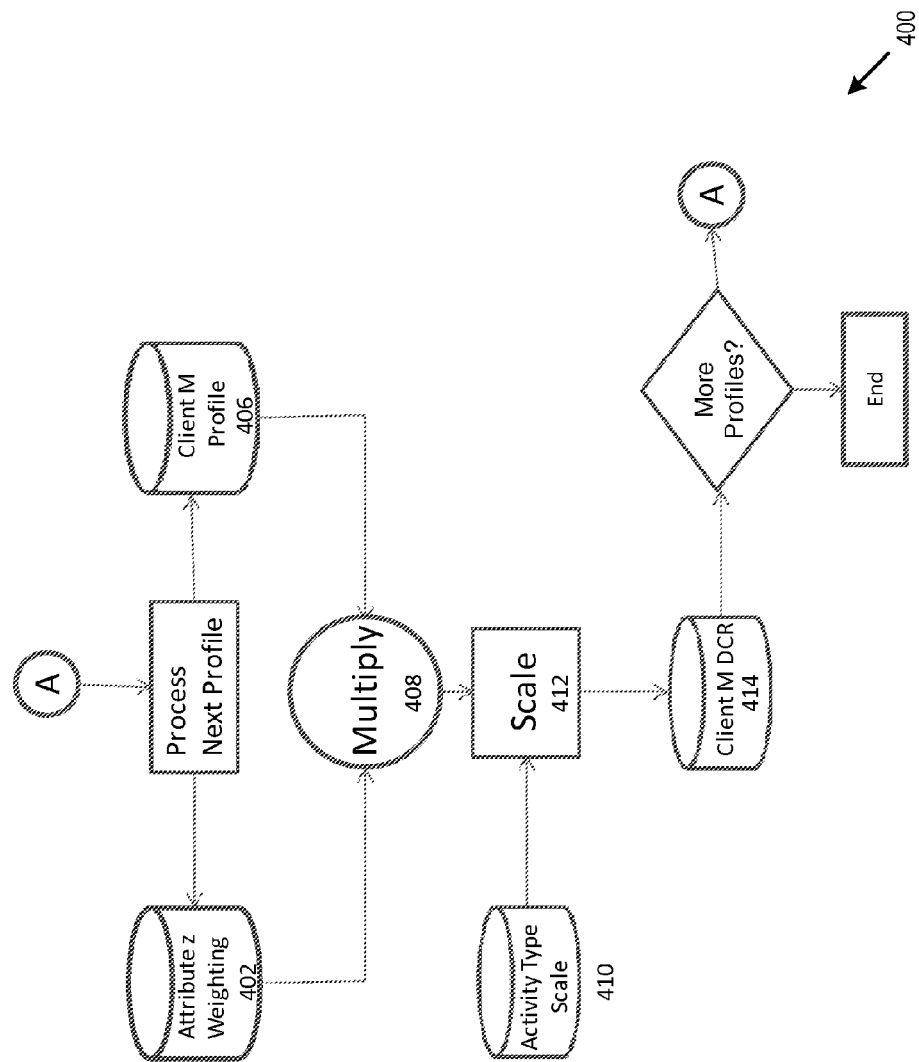
FIG. 4 is a flowchart that illustrates an embodiment of the logic instructions the system may execute to calculate activity feed parameters based on a client profile.

FIG. 4 is a flowchart that illustrates an embodiment of the logic instructions the system may execute to calculate activity feed parameters based on a client profile and attribute weighting. The system implements a method of determining the point of transition from one condition of min and/or max count of notifications per (dmin/dmax/tmax) to another for a given client M based on a set of profiles 406 attributed to a client. The point of transition may correspond to a lifecycle stage modeled by the system for an activity type. The system may model the client profiles and/or user profiles in order to configure the activity feeds and/or to provide default configurations optimized for the characteristics of the client.

For example, the system models a mature artist with a global market and a large number of works in one or more catalogues of data is to calculate a forecasted amount and frequency of data to be communicated to the system for the client by the partners and/or other sources. While the system may model differently a new artist with a target market in France and a smaller catalogue of work relative to the mature artist, and thus, the system configures the activity types for different client profiles and/or user profiles.

The optimum time for the transition from one lifecycle stage to another may depend on criteria associated with the type of client (406), which may be sequentially accessed by a memory addressing system 404. The system maintains a unique profile for each client M, which affects the weighting 402 applied to predetermined activity types and/or to define the activity types associated with the client M (408), the minimum amount of data Dmin, the maximum amount of data Dmax and the time period over which the data is counted Tmax. The system may scale 412 the combination of the client profile and the associated weighting using a predetermined value 410 (e.g., activity type scale) to calculate model (e.g., optimized) values for Dmin, Dmax and/or Tmax and a point of transition (e.g., start and end times for the lifecycle stages) for the given activity type. The scale may identify one or more templates of lifecycle stages used to configure Dmin, Dmax, and Tmax for each of the lifecycle stages.

Examples of parameters associated with a client profile that may impact Dmin, Dmax and/or Tmax and the point(s) in time when a transition (e.g., transition to a next lifecycle stage of an activity type) from one value of Dmin, Dmax and/or Tmax to another may include: the client type; user class type; number of titles; anticipated ramp of acceptance; type of data (activity type); strategic and/or non strategic client; and data associated with a strategic geographic region.

For example a new artist with a limited number of works may have lower quantitative value of the 'Client Type' and as a consequence the trigger point for a specific type of data may take place after a lower time period when compared to more mature artist with a large portfolio of works. Thus for each activity type and for each client profile the system determines an optimum point of transition from one set of Dmin/Dmax/Tmax limits to another, which may be unique for each client and which may take into account each type of data and the starting characteristics of the client. The system provides an activity feed that is tailored to provide an optimum type and quantity of data based on the characteristics of the client (e.g., client data compression rules (DCRs) 414), and so that the characteristics of the data within the activity feed may be efficiently modified over time (e.g., by the system client, client representative or any combination thereof).

Figure 5:
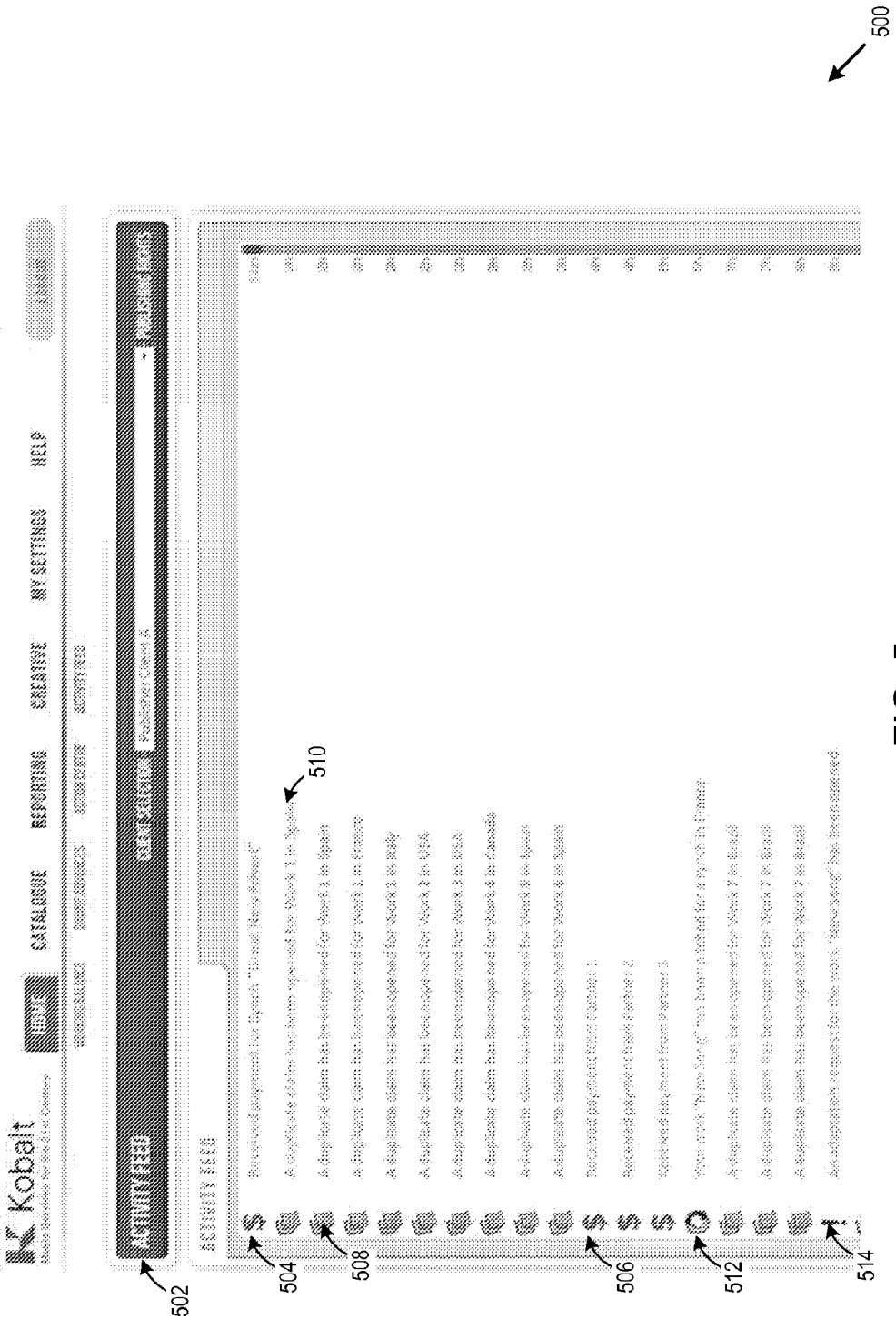
FIG. 5 illustrates a display of activity feed messages according to client configurable activity feed preferences.

FIG. 5 illustrates a display 500 of activity feed 502 messages according to client configurable activity feed preferences. The activities feeds 502 may identify one or more payments received for a work (504, 506), status information for duplicate claims incidents for alleged duplicate registrations (508, 510), notice of a synchronization pitch occurring 512, and a notice of opening an adaptation request for a work 514.

Figure 6:
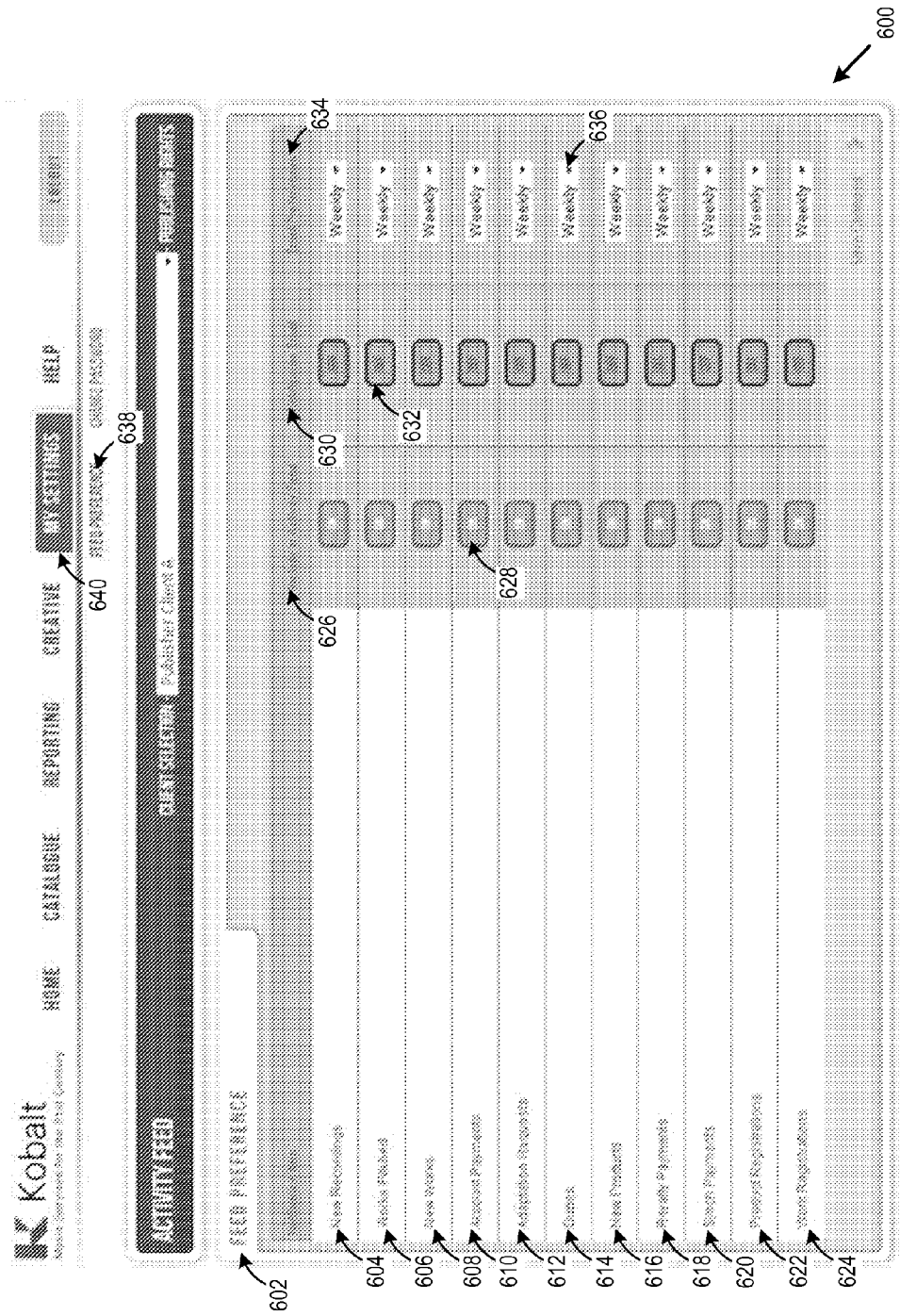
FIG. 6 illustrates a display of client configurable activity feed preferences.

FIG. 6 illustrates a display 600 of client configurable activity feed preferences 602. The activity feed preferences 602 may include new recordings 604, works pitched 606, new works 608, account payments 610, adaptation requests 612, dupes 614, new products 616, royalty payments 618, synch payments 620, product registrations 622, and work registrations 624. The client (user) may configure the activities feeds including whether to include an activity 626 in the activity feed (select to turn on or off 628), whether to notify the client (user) by email 630 (select to turn on or off 632) and the frequency 634 to email the activity feed (select frequency intervals including hourly, daily, weekly and monthly 636).

The system 102 may present the display 600 of client configurable activity feed preferences 602 from the client (user) selection of the feed preference 638 option under the 'my settings' 640 menu option.

Figure 7:
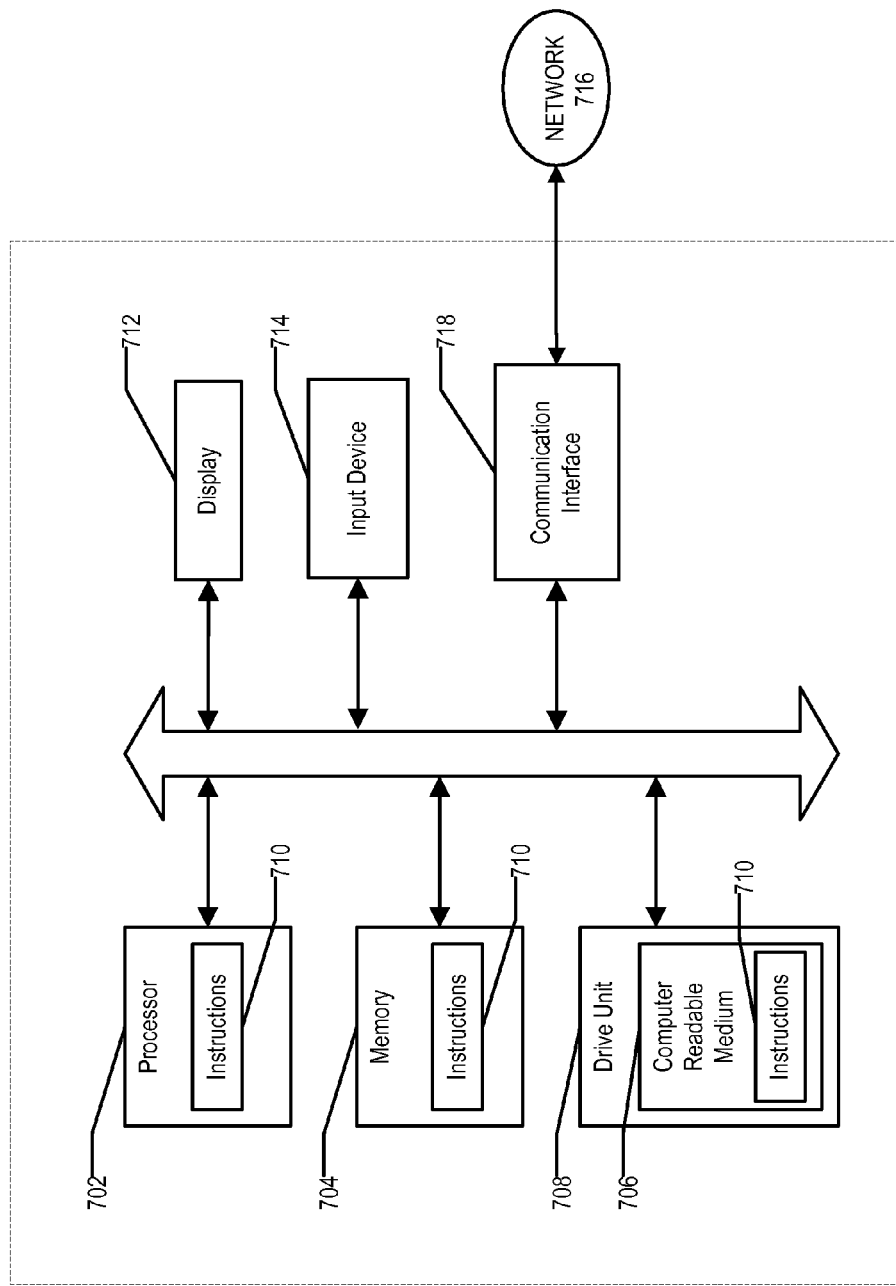
FIG. 7 illustrates one embodiment of a general computer system that may be used to implement the global registration system.

FIG. 7 illustrates one embodiment of a general computer system that may be used to implement the global registration system. The general computer system 700, which may represent the global registration system, or any of the other computing devices referenced herein that may be used to provide the system and methods. The computer system 700 may include a set of instructions 710 that may be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 710 (sequential or otherwise) that specify actions to be taken by that machine. In a particular embodiment, the computer system 700 may be implemented using electronic devices that provide voice, video or data communication. Further, while a single computer system 700 may be illustrated, the term "system" shall also be taken to include any collection of systems or subsystems that individually or jointly execute a set, or multiple sets, of instructions to perform one or more computer functions.

As illustrated in FIG. 7, the computer system 700 may include a processor 702, such as, a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus. The memory 704 may be a main memory, a static memory, or a dynamic memory. The memory 704 may include, but may not be limited to computer readable storage media (e.g., a non-transitory memory) such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 704 may include a cache or random access memory for the processor 702. Alternatively or in addition, the memory 704 may be separate from the processor 702, such as a cache memory of a processor, the system memory, or other memory. The memory 704 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 704 may be operable to store instructions 710 executable by the processor 702. The functions, acts or tasks illustrated in the figures or described herein may be performed by the programmed processor 702 executing the instructions 710 stored in the memory 704. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 700 may further include a display 712, such as a liquid crystal display (LCD), an organic light emitting diode (OLED), a flat panel display, a solid state display, a cathode ray tube (CRT), a projector, a printer or other now known or later developed display device for outputting determined information. The display 712 may act as an interface for the user to see the functioning of the processor 702, or specifically as an interface with the software stored in the memory 704 or in the drive unit 708.

Additionally, the computer system 700 may include an input device 714 configured to allow a user to interact with any of the components of system 700. The input device 714 may be a number pad, a keyboard, or a cursor control device, such as a mouse, or a joystick, touch screen display, remote control or any other device operative to interact with the system 700.

The computer system 700 may also include a disk or optical drive unit 708. The disk drive unit 706 may include a computer-readable medium 706 in which one or more sets of instructions 710, e.g. software, can be embedded. Further, the instructions 710 may perform one or more of the methods or logic as described herein. The instructions 710 may reside completely, or at least partially, within the memory 704 and/or within the processor 702 during execution by the computer system 700. The memory 704 and the processor 702 also may include computer-readable media as discussed above.

The present disclosure contemplates a computer-readable medium 706 that includes instructions 710 or receives and executes instructions 710 responsive to a propagated signal; so that a device connected to a network 716 may communicate voice, video, audio, images or any other data over the network 716. Further, the instructions 710 may be transmitted or received over the network 716 via a communication interface 718. The communication interface 718 may be a part of the processor 702 or may be a separate component. The communication interface 718 may be created in software or may be a physical connection in hardware. The communication interface 718 may be configured to connect with a network, external media, the display 712, or any other components in system 700, or combinations thereof. The connection with the network 716 may be a physical connection, such as a wired Ethernet connection or may be established wirelessly as discussed below. Likewise, the additional connections with other components of the system 700 may be physical connections or may be established wirelessly.

The network 716 may include wired networks, wireless networks, or combinations thereof. The wireless network may be a cellular telephone network, an 802.11, 802.16, 802.20, or WiMax network. Further, the network 716 may be a public network, such as the Internet, a private network, such as an intranet, or combinations thereof, and may utilize a variety of networking protocols now available or later developed including, but not limited to TCP/IP based networking protocols.

The computer-readable medium 706 may be a single medium, or the computer-readable medium 706 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 706 may include a solid-state memory such as a memory card or other package that houses one or more non-volatile read-only memories. The computer-readable medium 706 also may be a random access memory or other volatile re-writable memory. Additionally, the computer-readable medium 706 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The invention claimed is:

1. A method for providing a client with an activity feed from a system that identifies activity status for works of the client, the method comprising:
   receiving, through a communications interface connected to a network, data from geographically disparate partners;
   reformatting, by a processor, the data into a unified format by comparing the data from each partner with respective partner rules for one or more activity types;
   extracting by the processor activity data from the reformatted data;
   creating by the processor activity posts for each work of the client from the extracted activity data;
   identifying by the processor an activity type from the one or more activity types that is associated with each of the activity posts created from the extracted activity data;
   storing the activity posts in a database;
   determining by the processor for each identified activity type whether duplicate activity posts exist associated with a same identified activity type and calculating the number of duplicate activity posts associated with the same identified activity type created during a user configurable period;
   identifying for each identified activity type a data count maximum value;
   comparing by the processor for each identified activity type the calculated number of duplicate activity posts during the user configurable period with the data count maximum value;
   based on the comparing, determining the calculated number of duplicate activity posts during the user configurable period is greater than the data count maximum value, and grouping the duplicate activity posts in a new activity post and posting the new activity post with the calculated number of duplicate activity posts to the activity feed display;
   retrieving a client view preference and a client type profile;
   communicating the activity feed display to a screen formatter;
   formatting by the processor the activity feed display into a form that is compatible with an equipment and a format requested by the client based on the retrieved client view preference and client type profile; and
   communicating, using the screen formatter, the activity feed display to the client.

2. The method of claim 1, further comprising:
   defining the activity feed to include a royalty administration and rights management (RARM) activity feed;
   wherein the system is a RARM system;
   receiving the data through the communications interface including RARM data;
   reformatting the RARM data into a unified format by comparing the RARM data from each partner with respective partner rules for the one or more activity types; and
   determining lifecycle stages of the works of the client and wherein the data count maximum value is independently configured for each lifecycle stage of the works for each activity type.

3. The method of claim 2, further comprising
   calculating, using an activity feed modeler, for each lifecycle stages for each activity type, a start time and an end time of the user configurable period and the data count maximum value.

4. The method of claim 2, where the activity types include:
   New works entered;
   New products entered;
   New recordings entered;
   work registration updates comprising Work registration updates activity sub-types: sent, in-progress, and confirmed;
   Product registrations comprising Product registrations activity subtypes: sent, in-progress, and confirmed;
   Duplicates comprising Duplicates activity sub-types: created, updated, closed, and action required;
   Royalty payment;
   Work pitched comprising Work pitched activity sub-types: pitched, hold, and cut;
   Synchronization status comprising Synchronization status activity subtypes: pitched, agreed, licensed, and paid;
   Adaptation request comprising Adaptation request activity sub-types: opened, closed, and action required;
   Advance paid;
   New action posted;
   New action completed;
   RARM system news;
   Industry news;
   User RARM system session time;
   Product sales great than a product sales threshold;
   Advances paid;
   Advance amount updated; and
   Multimedia play counts greater than a configurable Multimedia play counts threshold.

5. The method of claim 1, where the partner rules, include rules for each activity type, including: registration rules, duplicate claims rules, adaptation requests rules, and synchronization rules;
   wherein the works of the client include lifecycle stages comprising a number of stages, wherein a duration of the lifecycle stages, a number of lifecycle stages or both, are based on one or more characteristic of the client, a registration date of the works directed to the activity type, a duration of the client's account or any combination thereof.

6. The method of claim 2, further comprising:
   synchronizing receipt of RARM data with the partners based on client preferences, including activity feed preferences for a configured time period, where the partners responsively communicate the activity feed data based on the activity feed preferences.

7. The method of claim 2, wherein the RARM data includes royalty data; and the method further comprises: associating the royalty data with the client by identifying a work to which the royalty data applies, type of rights held by the client for the work, and attributes of the royalty data.

8. The method of claim 1, further comprising:
communicating, to the client, a notice of registration of a work in a territory.

9. The method of claim 2, wherein the activity types include Adaptation request comprising Adaptation request activity sub-types: opened, closed, and action required, and the lifecycle stages of the adaptation request activity type comprise:
   receiving, in the RARM data, an adaptation request from another to produce an adaptation of a work of the client;
   communicating, to the requester, a request for required adaptation request information;
   receiving, from the requester, the required adaptation request information;
   ingesting the adaptation request information;
   generating an adaptation request activity feed, where the adaptation request activity feed that communicates to the client a request for an action by the client to review, provide a decision or both, where the decision includes: approve request; or decline request.

10. The method of claim 9, wherein the adaptation request information describes the nature of the proposed adaptation of the work of the client and the terms of agreement the requester proposes under which the requester may adapt the work.

11. A system for providing a client with a royalty administration and rights management (RARM) activity feed that identifies activity status for works of the client, the system comprising:
   a display interface;
   a communications interface; and
   a non-transitory memory coupled with a processor, wherein the communications interface configured to provide communications between the RARM system and geographically disparate partners systems;
   the memory having stored thereon:
   processor executable instructions that when executed by the processor cause the processor to:
      receive, through the communications interface connected to a network, RARM data from the partners;
      reformat the RARM data into a unified format by comparing the RARM data from each partner with respective partner rules for one or more activity types;
      extract activity data from the reformatted RARM data;
      create activity posts for each work of the client from the extracted activity data;
      identify an activity type from the one or more activity types that is associated with each of the activity posts created from the extracted activity data;
      store the activity posts in a database;
      determine by the processor for each identified activity type whether duplicate activity posts exist associated with a same identified activity type and calculating the number of duplicate activity posts associated with the same identified activity type created during a user configurable period;
      identify for each identified activity type a data count maximum value;
      compare by the processor for each identified activity type the calculated number of duplicate activity posts during the user configurable period with the data count maximum value;
      based on the comparing, when the calculated number of duplicate activity posts during the user configurable period is less than or equal to the data count maximum value, then post each of the duplicate activity posts to an activity feed display; or
      based on the comparing, when the calculated number of duplicate activity posts during the user configurable period is greater than the data count maximum value, then group the duplicate activity posts in a new activity post and post the new activity post with the calculated number of duplicate activity posts to the activity feed display;
      retrieve a client view preference and a client type profile;
      communicate the activity feed display to a screen formatter;
      format by the processor the activity feed display into a form that is compatible with an equipment and a format requested by the client based on the retrieved client view preference and client type profile; and
      communicate, using the screen formatter, the activity feed display to the client.

12. The system of claim 11, where the processor executable instructions further cause the processor to:
   determine lifecycle stages of the works of the client and independently configure the data count maximum value for each lifecycle stage of the works for each activity type.

13. The system of claim 12, where the processor executable instructions further cause the processor to:
   calculate, using an activity feed modeler, for each lifecycle stage for each activity type, a start time and an end time of the user configurable period and the data count maximum value.

14. The system of claim 11, where the activity types include:
   New works entered;
   New products entered;
   New recordings entered;
   Work registration updates comprising Work registration updates activity sub-types: sent, in-progress, and confirmed;
   Product registrations comprising Product registrations activity subtypes: sent, in-progress, and confirmed;
   Duplicates comprising Duplicates activity sub-types: created, updated, closed, and action required;
   Royalty payment;
   Work pitched comprising Work pitched activity sub-types: pitched, hold, and cut;
   Synchronization status comprising Synchronization status activity sub-types: pitched, agreed, licensed, and paid;
   Adaptation request comprising Adaptation request activity sub-types: opened, closed, action required;
   Advance paid;
   New action posted;
   New action completed;
   RARM system news;
   Industry news;
   User RARM system session time;
   Product sales great than a product sales threshold;
   Advances paid;
   Advance amount updated; and
   Multimedia play counts greater than a configurable Multimedia play counts threshold.

15. The system of claim 11, where the partner rules, include rules for each activity type, including: registration rules, duplicate claims rules, adaptation requests rules, and synchronization rules;

wherein the works of the client include lifecycle stages comprising a number of stages, wherein a duration of the lifecycle stages, a number of lifecycle stages or both, are based on one or more characteristic of the client, a registration date of the works directed to the activity type, a duration of the client's account or any combination thereof.

16. The system of claim 11, where the processor executable instructions further cause the processor to:
synchronize receipt of RARM data with the partners based on client preferences, including activity feed preferences for a configured time period, where the partners responsively communicate the activity feed data based on the activity feed preferences.

17. The system of claim 11, wherein the RARM data includes royalty data; and
where the processor executable instructions further cause the processor to: associate the royalty data with the client by identifying a work to which the royalty data applies, type of rights held by the client for the work, and attributes of the royalty data.

18. The system of claim 11, where the processor executable instructions further cause the processor to:
communicate, to the client, a notice of registration of a work in a territory.

19. The system of claim 12, wherein the activity types include Adaptation request comprising Adaptation request activity sub-types: opened, closed, and action required, and the lifecycle stages of the adaptation request activity type comprise:
receiving, in the RARM data, an adaptation request from another to produce an adaptation of a work of the client;
communicating, to the requester, a request for required adaptation request information;
receiving, from the requester, the required adaptation request information;
ingesting the adaptation request information;
generating an adaptation request activity feed, where the adaptation request activity feed that communicates to the client a request for an action by the client to review, provide a decision or both, where the decision includes: approve request, or decline request.

20. The system of claim 19, wherein the adaptation request information describes the nature of the proposed adaptation of the work of the client and the terms of agreement the requester proposes under which the requester may adapt the work.

* * * * *